United States Patent
Keppler et al.

(10) Patent No.: US 10,528,734 B2
(45) Date of Patent: Jan. 7, 2020

(54) SYSTEM AND METHOD FOR VETTING MOBILE PHONE SOFTWARE APPLICATIONS

(71) Applicant: The MITRE Corporation, McLean, VA (US)

(72) Inventors: David Keppler, Herndon, VA (US);
Ivan Lozano, Arlington, VA (US);
Joseph Portner, Hampton, VA (US);
Andrew Pyles, Williamsburg, VA (US);
Christina L. Johns, Arlington, VA (US); David Bryson, Montgomery, AL (US)

(73) Assignee: The MITRE Corporation, McLean, VA (US)

( * ) Notice: Subject to any disclaimer, the term of this patent is extended or adjusted under 35 U.S.C. 154(b) by 324 days.

(21) Appl. No.: 15/081,280

(22) Filed: Mar. 25, 2016

(65) Prior Publication Data

US 2017/0277891 A1 Sep. 28, 2017

(51) Int. Cl.
*G06F 21/56* (2013.01)
*H04L 29/06* (2006.01)
(Continued)

(52) U.S. Cl.
CPC .......... *G06F 21/566* (2013.01); *G06F 21/552* (2013.01); *G06F 21/554* (2013.01);
(Continued)

(58) Field of Classification Search
CPC ............. G06F 21/566; G06F 2221/033; G06F 21/554; G06F 21/577; G06F 21/552; H04L 63/1491; H04L 63/1433
See application file for complete search history.

(56) References Cited

U.S. PATENT DOCUMENTS 8,725,585 B1   5/2014  Kay et al.
8,806,647 B1 * 8/2014  Daswani ............. H04L 63/1425
                                                  726/25
(Continued)

FOREIGN PATENT DOCUMENTS

CN       103685251      3/2014
WO    WO 2014/172064   10/2014
WO    WO 2014/204446   12/2014

OTHER PUBLICATIONS

Gilbert, Peter et al., 2011, "Vision: Automated Security Validation of Mobile Apps at App Markets"; 5 pages.
(Continued)

*Primary Examiner* — Cheng-Feng Huang
(74) *Attorney, Agent, or Firm* — Morrison & Foerster LLP

(57) ABSTRACT

A system and method for implementing a software emulation environment is provided. In one example, a mobile application can interface with an emulation environment that can be used to test whether the mobile application includes malware that can compromise the security and integrity of an enterprise's computing infrastructure. When the mobile application issues a call for data, a device mimic module can intercept the call and determine if the call includes a call for one or more checkable artifacts that can reveal the existence of the emulation environment. If such a call for data occurs, the device mimic module can provide one or more spoofed checkable artifacts that have been recorded from a real-world mobile device. In this way, the existence of the emulation environment can be concealed so as to allow for a more thorough analysis of a mobile application for potential hidden malware.

15 Claims, 9 Drawing Sheets

(51) Int. Cl.
 *G06F 21/55* (2013.01)
 *G06F 21/57* (2013.01)
(52) U.S. Cl.
 CPC ........ *G06F 21/577* (2013.01); *H04L 63/1433* (2013.01); *H04L 63/1491* (2013.01); *G06F 2221/033* (2013.01)

(56) References Cited

U.S. PATENT DOCUMENTS

| | | | |
|---|---|---|---|
| 8,844,032 B2 | 9/2014 | Saidi et al. | |
| 8,875,289 B2 | 10/2014 | Mahaffey et al. | |
| 9,667,613 B1* | 5/2017 | Wisemon | H04L 63/08 |
| 9,811,665 B1* | 11/2017 | Xu | G06F 21/562 |
| 2002/0013910 A1* | 1/2002 | Edery | G06F 21/52 726/24 |
| 2013/0097706 A1* | 4/2013 | Titonis | G06F 21/56 726/24 |
| 2013/0227683 A1* | 8/2013 | Bettini | G06F 21/57 726/22 |
| 2013/0304677 A1* | 11/2013 | Gupta | G06N 5/043 706/12 |
| 2014/0298403 A1* | 10/2014 | Qureshi | G06F 21/41 726/1 |
| 2014/0298420 A1* | 10/2014 | Barton | H04L 63/10 726/4 |
| 2014/0380414 A1 | 12/2014 | Saidi et al. | |
| 2015/0089497 A1 | 3/2015 | Borzycki et al. | |
| 2015/0101048 A1* | 4/2015 | Sridhara | G06F 21/55 726/23 |
| 2015/0121524 A1* | 4/2015 | Fawaz | G06F 21/566 726/23 |
| 2015/0161386 A1* | 6/2015 | Gupta | G06F 11/3612 726/23 |
| 2015/0169893 A1* | 6/2015 | Desai | H04L 51/18 726/1 |
| 2015/0199515 A1* | 7/2015 | Qureshi | G06F 21/56 726/22 |
| 2015/0286820 A1* | 10/2015 | Sridhara | G06F 21/566 726/23 |
| 2016/0099963 A1* | 4/2016 | Mahaffey | H04L 63/0227 726/25 |
| 2016/0154960 A1* | 6/2016 | Sharma | G06F 21/56 726/25 |
| 2016/0337104 A1* | 11/2016 | Kalligudd | H04W 76/10 |
| 2017/0004303 A1* | 1/2017 | Yan | G06F 21/56 |
| 2017/0134405 A1* | 5/2017 | Ahmadzadeh | H04L 63/1416 |

OTHER PUBLICATIONS

Burguera, Iker et al., Jan. 2011, "Crowdroid: Behavior-Based Malware Detection System for Android", ResearchGate; 12 pages.
Zhang, Yuan et al., 2013, "Vetting Undesirable Behaviors in Android Apps with Permission Use Analysis"; 12 pages.
Vidas, Timothy et al., Feb. 2013, "A5: Automated Analysis of Adversarial Android Applications", Carnegie Mellon University; 26 pages.
Quirolgico, Stephen et al., Apr. 2014, AppVet, Version 1.0, National Institute of Standards and Technology; 46 pages.
Amini, Shahriyar, May 2014, "Analyzing Mobile App Privacy Using Computation and Crowdsourcing", Carnegie Mellon University; 197 pages.
Security News, Nov. 2014, "How Vetting Mobile Apps Works for App Stores and Its Users"; 5 pages.
Xia, Mingyuan et al., 2015, "Effective Real-time Android Application Auditing", IEEE Symposium on Security and Privacy; 16 pages.
Flynn, Lori, Mar. 2015, "An Enhanced Tool for Securing Android Apps", Software Engineering Institute, Carnegie Mellon University; 6 pages.

* cited by examiner

SYSTEM AND METHOD FOR VETTING MOBILE PHONE SOFTWARE APPLICATIONS

STATEMENT REGARDING FEDERALLY SPONSORED RESEARCH OR DEVELOPMENT

This invention was made with Government support under U.S. Government contract W56KGU-14-C-0010 awarded by the U.S. Department of the Army. The Government has certain rights in this invention.

FIELD OF THE DISCLOSURE

This disclosure relates to the vetting of mobile phone software applications to be loaded and used on a mobile phone device. More specifically this relates to systems and methods of masking an emulation environment to increase the likelihood of identifying any potentially embedded malicious code contained with the software application.

BACKGROUND OF THE DISCLOSURE

Mobile application vetting, the process of determining which third-party applications are safe to deploy on mobile devices, is a challenging problem facing many personal, corporate, and government users of such devices. In the context of multiple mobile devices belonging to private businesses or government agencies, malicious software programs downloaded by users of the mobile devices can compromise the safety and security of the infected device but can also compromise the safety and security of an organization's entire computing network.

In an attempt to prevent malicious software ("malware"), contained within a particular mobile device software application, from infecting a user's device or an enterprise's computing network, mobile applications can be vetted by an enterprise security team to assess the safety of a particular mobile device software application. Conventionally, cybersecurity teams have employed emulation environments that allow the team to assess the safety of a particular application before allowing for its use by users of the enterprise's mobile devices. An emulation environment or "sandbox" can refer to a testing environment that allows for the use and testing of software applications in an isolated environment (i.e., an environment in which the untested code cannot access a live mobile device or access a computing network).

Unfortunately, unscrupulous malware programmers have attempted to thwart enterprise security teams' attempts at detecting malware contained with mobile device applications, by programming the malware to evade the emulation environment.

One way to ensure that such evasive tactics used by malware to evade detection is defeated is by loading the mobile device software application containing the malware on a test device that is not connected to the enterprise's network or is otherwise isolated and use the software application on the device as it was intended to be used. Such an approach, however, can be costly in terms of time and effort needed for enterprise computer security personnel to load the application onto a test device and use it sufficiently to ensure that any malware has been exposed. Such an approach can completely forgo the benefit of automatic detection of malware that an automated emulation environment can provide.

SUMMARY OF THE DISCLOSURE

Accordingly, a system and method are provided for vetting mobile device software applications in which the appearance of "realism" in an automated emulation environment is enhanced. The system and method can include instrumentation for controlling and manipulating an application's view of its execution environment in order to accurately simulate an end-user's use of the mobile device and software application so as to counter evasive malware techniques seeking to avoid detection and trigger hidden application behaviors gated on various system properties or application input patterns.

DETAILED DESCRIPTION

Figure 1:
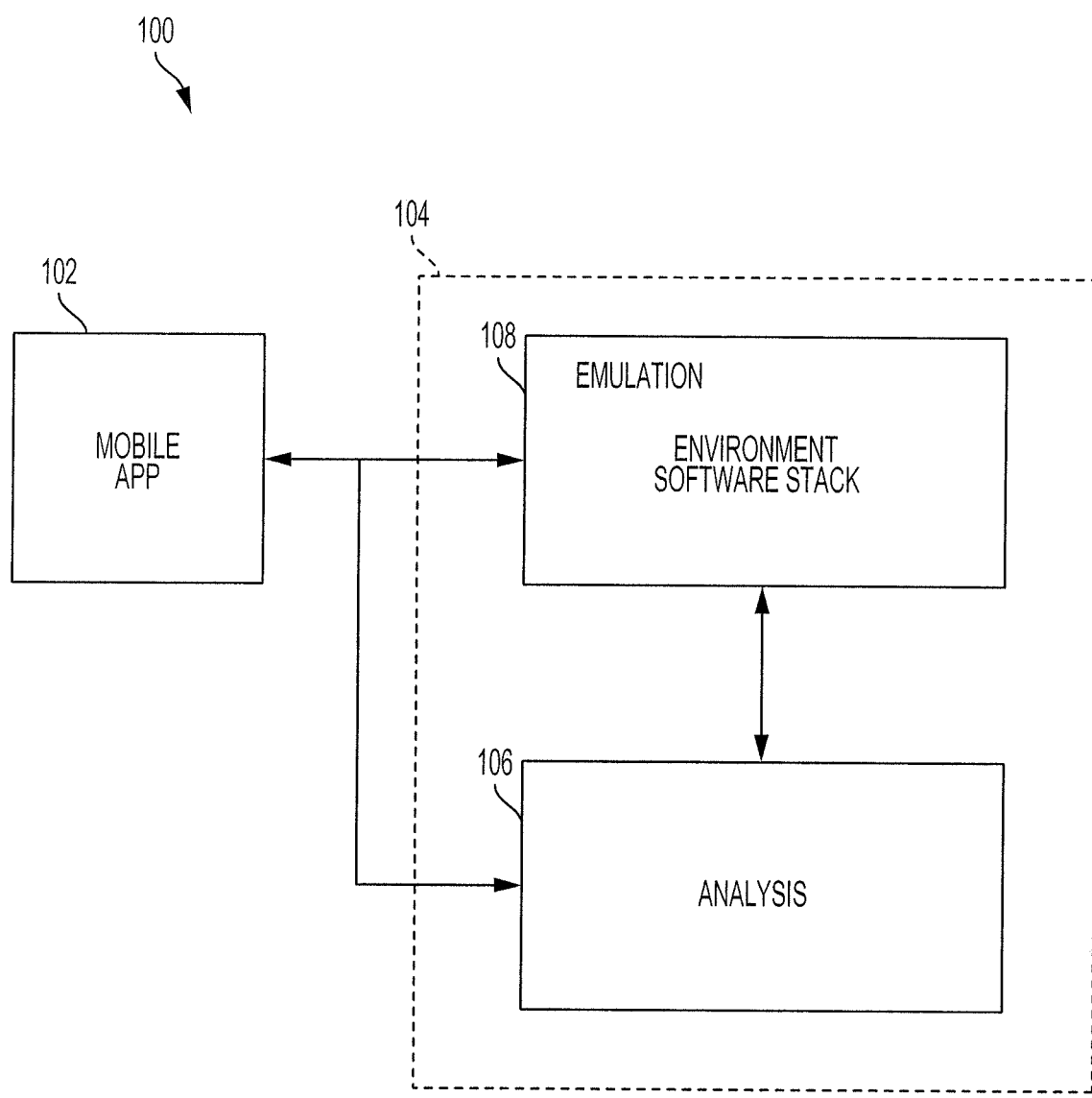
FIG. 1 illustrates an exemplary mobile application vetting system according to examples of the disclosure.

Described herein are systems and methods for vetting mobile phone software applications prior to their use on a user's mobile device. The systems and methods described herein can be used to ensure that a particular mobile software application does not contain malicious software that can threaten the security and integrity of not only the device on which the software application resides, but also the underlying network to which the mobile device is connected.

The systems and methods employ analytical tools designed to create and maintain a virtual emulation environment that closely replicates the type of environment that would be experienced by a software application if it were installed on a real-world device. In this way, any malware on the application that seeks to deceive conventional malware detection techniques by attempting to detect that the application is being run on an emulation environment as supposed to a real-world device, can be exposed and remedied.

An enterprise computing environment can include many different types of computing devices including personal computers, laptops, and servers that are networked with one another to form an organization's (i.e., enterprise) computing environment over which a business can be conducted. Mobile devices such as tablet computers or mobile devices can also be part of an enterprise's computing environment and can also be connected to an enterprise's computing network. In addition to being connected to a computing network, mobile devices can also connect to other, more public networks, such as the World Wide Web. Given the ability of mobile devices to connect to both an enterprise's computing network and public networks, the use of mobile devices such as a tablet or phone can pose a risk to the enterprise computing network, potentially compromising sensitive data stored in the enterprise's network or reducing the functionality of the network. In addition, the ability of mobile devices to interact with public networks can also put the device itself at risk, compromising the functionality of the device and also compromising the security of the device.

One method by which access to public networks can compromise the security of an enterprise mobile device and/or network is via mobile software applications ("mobile apps"). Mobile apps are software applications that a user of a mobile device can purchase and/or download over the internet either from an e-commerce store, or other online entity. While many mobile apps can enhance the functionality of the mobile device, or provide utility to the user of the mobile device, they can also act as a vehicle for malware to penetrate, not only the mobile device, but also any computer networks that the mobile device may connect to.

Therefore, in an enterprise computer security environment, mobile apps that users of the mobile devices wish to download are conventionally "vetted" by an enterprise computer security team who, once the vetting has occurred, can authorize the download of the mobile app. Vetting a mobile app can include determining whether or not a mobile app contains any malware designed to compromise the security or integrity of the mobile device on which it resides or the computer networks with which it shares information.

One exemplary method of vetting a mobile app is to run the app in an emulation environment. FIG. 1 illustrates an exemplary mobile application vetting system according to examples of the disclosure. In the system depicted in FIG. 1, a mobile application 102 that is to be vetted can be downloaded over the internet or other public network into an emulation environment 104. Emulation environment 104 can be a computer program or physical device that is configured to recreate a typical environment in which a mobile application 102 would operate in. The emulation environment 104 can tightly control computing resources available to the mobile application 102 so as to allow for the mobile application to be tested while at the same time either completely mitigating or minimizing the potential for the mobile application to compromise the security of a device or network. Examples of computing resources that can be controlled are network access of the mobile application, the ability to inspect the host system or read from input devices. In many cases, these types of functionalities are disallowed by the emulation environment all together, but in some examples the functionalities can be restricted.

Once the mobile application 102 has been downloaded into the emulation environment 104, it can then proceed to be operated in a normal fashion via the emulation environment. For example, any inputs that are to be sent to the mobile application can be inputted via the emulation environment 104. Likewise, any system calls or outputs that are generated by the mobile application 102 can be fielded by the emulation environment 104 via the emulation environment software stack 108 (explained in detail below). In this way, if malware exists within the mobile application 104, any malicious system calls or improper network access can be fielded by the emulation environment 104, and more specifically the emulation environment software stack 108, as opposed to a real-world device.

The system 100 can also include an analysis module 106 that can analyze the interactions between the emulation environment software stack 108 and the mobile application 102. The analysis module 106 can observe the interactions between the mobile application 102 and the emulation environment software stack 108 and look for certain behaviors or patterns of behaviors that can be commensurate with the operation of malware within the mobile application 102. As an example, if mobile application 102 attempts to access device sensitive device data such as a user's login credentials or web history and then attempts to send that data to an external web server via the internet, analysis module 106 can detect that activity and alert a computer security professional performing the analysis of such conduct by the mobile application 102. Based on the information generated by the analysis module 102, the computer security professional can render a decision as to whether the mobile application 102 can be deployed on enterprise mobile devices.

In large part due to the security system depicted in FIG. 1 and described above, modern malware programmers have attempted to defeat such a system ultimately hoping that the malware embedded in a mobile application will go undetected within an emulation environment. One method by which malware can seek to defeat the protections engendered by an emulation environment vetting process is to detect the presence of the emulation environment itself. In another example, malicious code within a mobile application can be gated (i.e., not activated) and only triggered upon receiving application stimuli that is unlikely to occur in an analysis environment. In one example, the malware may attempt to evade the emulation environment by detecting that an analysis in the emulation environment is underway and shutting itself off so as to avoid detection. In another example, the malware may be programmed to remain dormant until a particular set of "real-world" conditions occur to trigger the malware's operation. "Real world" conditions can include behaviors that the software could detect that would likely occur in real-world end user usage of a mobile device, but would most likely not occur in an emulation environment. As an example, the malware could detect motion on a mobile device's accelerometer to determine whether the device is moving in accordance with use of the device.

The ability for a mobile application to detect that it is executing in an emulation environment allows malicious code to shut down for the duration of a vetting test, enabling any malicious behaviors to go undetected.

Examples of emulation environment detection techniques that can be used to evade security vetting can include timing attacks, binary translation detection, cache behavior detection, and operating system emulation artifacts. The last three are examples of detection techniques that are specific to the Android™ operating system and are provided as examples of operating system specific detection techniques that can be employed by malware to detect emulation environments. The techniques listed above can arise from incorrect environment execution, emulation optimization, or simple performance limitations that would be found in an emulation environment.

Timing attacks can rely on the fact that the emulator will be slower than real hardware by an order of magnitude or more. As an example of the timing disparity, some difficult task running on the mobile application is run in a loop thousands of times until a discernible amount of time has passed. This time can be compared against a reasonable amount of time such a task should have taken. If the time is slower, the malware can detect the condition and either cease operation or fail to initiate in order to defeat the security inspection.

Binary translation detection can take advantage of how some emulators translate a block of instructions from one language into one or more instructions in another language. This binary translation can result in unusually regular times between thread context switches and can be detected by malware. Upon detection the malware can either cease operation or fail to initiate in order to defeat the security inspection.

Cache behavior detection can take advantage of the fact that some Android emulators do not correctly model the non-coherent behavior between the I-cache and D-cache used in the ARM® processor commonly found in mobile devices. Malware can detect whether the cache is coherent and if it is, the malware can detect the condition and either cease operation or fail to initiate in order to defeat the security inspection.

OS emulation artifact detection can take advantage of the fact that some Android emulators provide several pipes and devices to the operating system which are specific to the emulation environment for optimization. Existence of these artifacts would easily indicate an emulated environment. Malware can detect these operating system artifacts and if detected, the malware can either cease operation or fail to initiate in order to defeat the security inspection.

Another method by which malware may attempt to detect an emulation environment is by searching for hardware capabilities of a device that would be missing in an emulation environment. Many emulation environments do not completely emulate the entire sensor suit that may be found in a device, and for the sensors that the emulation environment attempts to emulate, the emulation environment may produce strange behaviors that may not be found if the device were operating in a real-world context. A few examples of hardware capabilities that malware can detect include missing sensors, abnormal sensor behavior, and missing hardware components.

In one example, the malware could detect the absence of a sensor that would be present in a real-world mobile device but may not present in an emulation environment. Examples of potentially missing sensors can include everything from missing common sensors (barometer, accelerometer, etc.) to missing custom sensors. Malware can use the absence of certain sensors to be indicative of an emulation environment and if the absence is detected, the malware can either cease operation or fail to initiate in order to defeat the security inspection. In addition to the absence of sensors, the malware can also use the number of sensors and their configuration to determine if the mobile application is running in an emulation environment.

Alternatively or in addition to the methods described above, the malware could also detect certain behaviors or patterns of behavior in sensor data that may be indicative of operation in an emulation environment. For instance, if a supposed sensor does not update as quickly as would be expected with a real-world sensor, does not provide output which is congruent with a noise environment that would typically be seen in a real-world environment, or does not look real (i.e., the accelerometer never changes value) than the malware can determine that its being operated in an emulation environment.

Alternatively, or in addition to the above methods, malware can also use operating system artifacts to determine whether it is being operated in an emulation environment. Using the Android operating system as an example, the Android application framework and underlying Linux file system may contain data points and system properties that can betray an emulated environment. For example the malware may detect compilation artifacts, build.prop values, counters, networking artifacts and existence of user artifacts generated by the operating system to detect an emulation environment.

Compilation artifacts can refer to artifacts that are left behind by the emulation environment and can be discovered by malware. Examples of compilation artifacts can include strings which are found in the kernel, the compilation date, username and hostname of the machine that compiled the operating system, the public keys used to sign an image, and similar data.

Build.prop values (a property of the Android OS) can contain many specific identifiers for different devices, such as the manufacturer name, device brand name, device serial number, hardware model number, and similar values that are unique to a particular physical device. In addition, there can be predictable, easily identifiable values in these fields that are commonly found in emulator environments and virtual machines.

Counters kept by the operating system can be used to determine an emulation environment. Applications can monitor and count various events that occur on a device, such as the number of times the screen has been locked, how often the device is rebooted, or how much time has passed since activation. Such events can allow an application to wait until a significant period of time has passed before activating latent malicious behavior, and can be longer than a dynamic analysis-based vetting process is able to spend on a single task.

Data about the network connectivity of a device may be available for applications to monitor. For instance the data can include properties of the wireless radios that include the cellular IMEI number, device phone number, cellular carrier name, hardware MAC addresses of Wi-Fi and Bluetooth devices, Wi-Fi network name, connectivity state of the radio links, and other information. Data about the properties at the IP networking layer can be monitored and may include the device's IP address(es), routing information, domain name lookup servers, and connected and listening ports of TCP or UDP belonging to operating system services or other applications, among others. Peculiarities or inconsistencies in these data can betray the existence of an emulation environment.

An application can also look for signs of user artifacts to detect emulation environments. For instance a great deal of data can accumulate on a device over time as a result of normal end-user usage. Such a "lived-in" device will contain phone call logs, text message logs, many installed applications, a populated contacts list, photos, a music and video library, and a variety of similar types of data. Synthetic analysis environments used for vetting and malware analysis often lack some or all of these.

In some examples, rather than using properties about an application's environment to determine the presence of an emulation environment, malware can also analyze the input delivered to the application during testing. Real-world usage of applications can yield more varied and diverse inputs than conventional automated input driving systems. Malicious application behavior can be gated to trigger only upon the occurrence of patterns that would not be produced by an emulation environment. Examples include: Geo-fencing. (Trigger application behaviors only when the mobile device travels to a particular physical location); Sensor input. (i.e., monitor physical sensor data (e.g. accelerometer, gyroscope, magnetic compass, light sensor, barometer) for patterns that can only exist in the real world); and touch screen input realism (the emulated touch screen input created by automated driving tools is precise and mechanical, lacking the noise and variance that human-originated input would exhibit).

Figure 2:
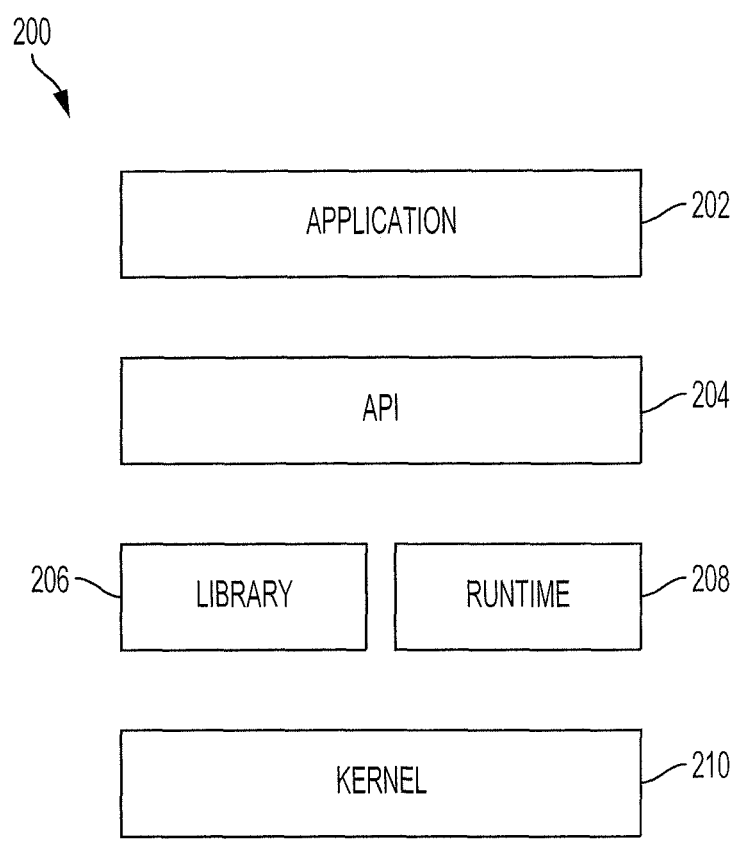
FIG. 2 illustrates an exemplary interaction between a software application and a mobile device according to examples of the disclosure.

All of the various methods described above that malware uses to detect an emulation environment can originate by the malware's access to the mobile device operating system software stack. FIG. 2 illustrates an exemplary mobile device operating system software stack according to examples of the disclosure. The operating system software stack 200 can begin with application 202, which represents a mobile device application that is downloaded to a mobile device. Mobile application 202 can interface with application program interface (API) 204. Application program interface 204 can represent one or more applications program interfaces that allow the mobile application to access pre-programmed functions that are available on the mobile device including the appearance of user interfaces, notifications, and other data related to the device that the application is interfacing with.

Libraries 206 can contain native libraries of the operating system and can perform various functions such as managing device displays, various databases employed by the mobile device, graphics libraries, etc. The operating system runtime 208 can be utilized by a mobile application 202 to convert its bytecode into native instructions that are later executed by the mobile devices runtime environment. Finally, the kernel 210 can act as a hardware abstraction layer between the hardware of the mobile device and the operating system software stack 200.

An emulation device can recreate the software stack that a mobile application would see when operating on a mobile device. As discussed above malware can detect this "emulated" software stack and gate itself until it can confirm that it is no longer operating in the emulation environment. Many of the emulator detection mechanisms discussed above can rely on artifacts which are detectable through the results of calls to the functions provided in the operating system stack API 204 or through examining objects at the lower levels of the underlying kernel 210. To defeat the aforementioned emulator detection techniques, an emulation environment can include a module that implements a mechanism to thoroughly mimic the properties of real devices within analysis execution environments and sandboxes. This mechanism can serve two purposes: 1) to hide the presence of emulation environment components and infrastructure from the application under test; and 2) to enhance the realism of the execution environment by altering and manipulating (or "spoofing") a broad range of data points listed previously that can be used for emulator detection.

Figure 3:
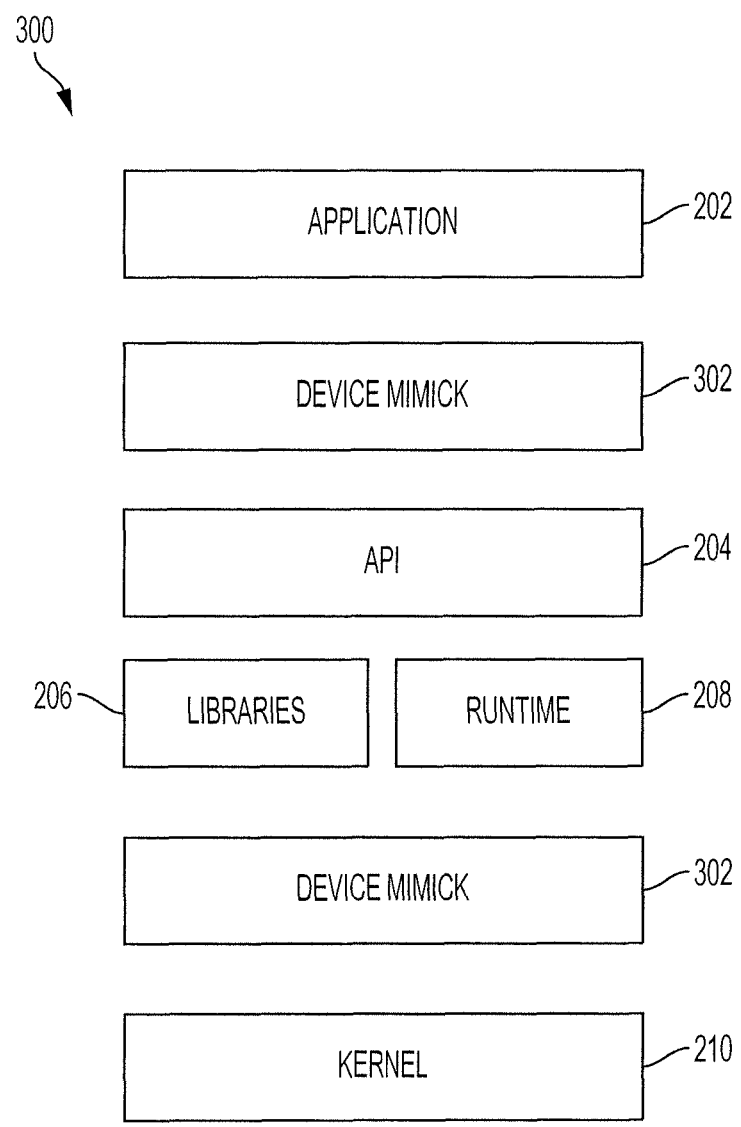
FIG. 3 illustrates an exemplary test bed for a mobile device software application that includes instrumentation for controlling and manipulating a software application's view of its execution environment according to examples of the disclosure.

FIG. 3 illustrates an exemplary emulation environment software stack with an emulation environment concealing module according to examples of the disclosure. The software stack 300 illustrated in FIG. 3 includes application module 202, API 204, libraries 206, run-time 208, and kernel 210 which are identical to their counterparts illustrated in FIG. 2, and thus a discussion of those components can be referenced above.

The software stack 300 can include a device mimic module 302 which can work to conceal emulation environment artifacts from the mobile application 202 when it is being tested in an emulation environment. The device mimic module 302 can allow the operators of an analysis execution sandbox/environment to control an application's view of its execution environment at all levels of the operating system stack. Control of the environment can be achieved through by methods including, but not limited to, modifying the operating system code, runtime hooking and interception of function calls and data accesses, system call hooking within the operating system kernel, file system manipulation through hooking or redirection (e.g., to a "shadow" file system tree containing different data), application binary rewriting, application-level sandboxing, and injecting an intermediary between an application and the operating system it runs within. The device mimic module 302 can intercept accesses to multiple API layers and data providers in order ensure that the emulation environment is concealed from mobile application under test. The layers of the API 204 can include access to operating systems services, application framework APIs and services, shared data providers, operating system kernel system calls, and file system access. Device mimic module 302 can be used to alter the apparent values of various system data points to counteract the aforementioned emulator detection techniques.

The following are examples of data points that can be altered by the device mimic module 302. The following examples are for purposes of illustration, and should not be considered as limiting. In one example, global system properties, including but not limited to, the device type, device manufacturer, and model branding marks can be altered to ensure that they mimic the values that would be returned by a mobile device during normal operation. In another example, device identification numbers including but not limited to device serial number, cellular modem IMEI number, SIM card ID number, phone numbers, and IP address can be mimicked by device mimic module 302 so as to return values to the mobile application that would mimic what a "real-world" device would return. In another example, network device states such as wireless network connectivity state, connected Wi-Fi network name, presence of a cellular data connection, and related data can be altered so as to mimic real-world devices. In another example, user-related data including but not limited to logged-in accounts (e.g. Google®, Facebook®, etc.,) installed applications and related data, contents of data providers (contacts lists, phone call and SMS logs, can be mimicked by device mimic 302.

In another example, the file system contents of the operating system including both user and system data can be mimicked. Using the Android operating system as an example, Linux system artifacts relating to hardware and system state (e.g., Linux /sys and /proc special purpose file systems), hardware peripherals (e.g., Linux /sys), running processes, etc., can be mimicked by device mimic module 302 so as to conceal the emulation environment software stack. In terms of user data, browser downloads, folder contents, photos, music, videos, and other personal data belonging to the user of their applications can be mimicked so as to conceal the emulation environment software stack. Device mimic module 302 can act as an intermediary between mobile application 202 and API 204 in addition to acting as an intermediary between libraries 206/runtime 208 and kernel 210. In this way, both components of the mimic module 302, one in each position, can help to achieve full control over the emulation environment software stack 300.

In another example, operating system data including a list of running processes, installed kernel modules and drivers, and the list of open network ports can be mimicked by the device mimic module 302. As a final example, controlling sources of nondeterminism (which can help to make an analysis easier) for example, controlling the operating system kernel's random number generators by intercepting file system reads to the /dev/random and dev/urandom devices (still using Android as an example). This can also ease analysis by causing encryption keys to be predictable and easily unlocked.

The device mimic module 302 can employ one or more of the methods described above, and other similar methods, in order to conceal the emulation environment from potential malware embedded in a mobile application. Once the results of lookups of these forms of data can be manipulated to cloak the artifacts arising from emulation, the next step to fully concealing the emulation environment can be to determine what values of data should be returned to the application under test.

Figure 4:
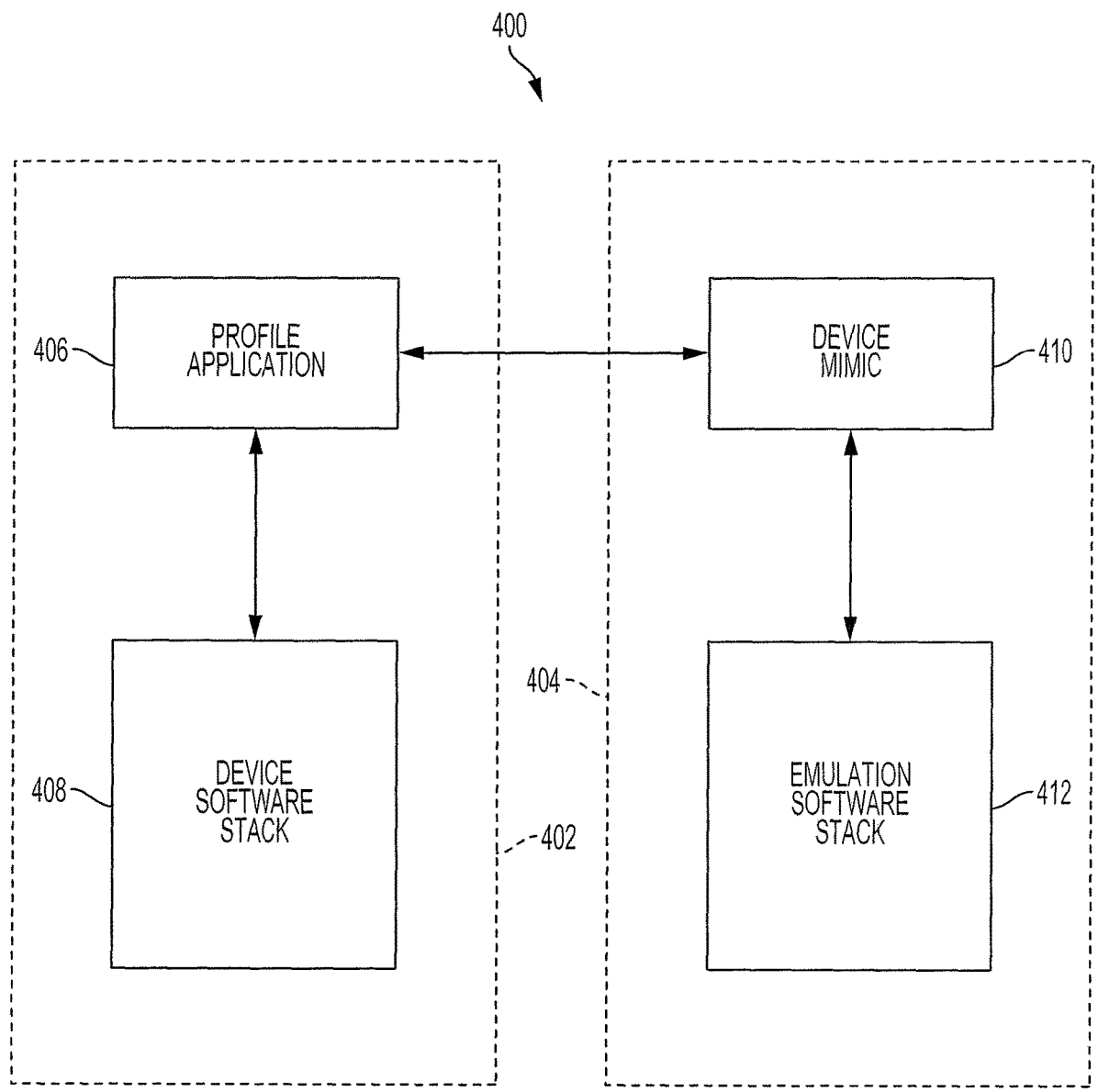
FIG. 4 illustrates an exemplary method for recording checkable artifacts for a mobile device according to examples of the disclosure.

In one example, the device mimic module 302 can utilize a device profiling application to record all the values for the checkable artifacts for a given physical phone or table device. The gathered data can then be employed by the device mimic module 302, so that when a mobile application 202 under test issues a system call, the cloned data points and values can be returned so as to conceal the emulation environment. FIG. 4 illustrates an exemplary method for recording checkable artifacts for a mobile device according to examples of the disclosure.

The system 400 of FIG. 4 can include two main components: the physical mobile device 402, and the emulation environment 404. In order to record the checkable artifacts as described above, a profile application 406 can be downloaded onto the mobile device 402. The profile application 406 can interact with the device software stack 408 so as to record information and data based on various checkable artifacts that malware can exploit to discover that it is operating in an emulation environment. The profile application 406 can then transmit the recorded data to the emulation environment and specifically to the device mimic module 410. When a mobile application is run in the emulation environment 404 and requests data that could expose the presence of the emulation environment, the device mimic module 410 can instead provide the data it received from the profile application 406 that was used to record the checkable artifacts of a "real-world" mobile device 402. In this way, the data presented to a mobile application running on the emulation environment 404 can appear as it would were the mobile application running on a physical device. The end result of this process is that the application can be fooled into thinking it is running on the selected physical device. Profiling may be done as a manual process involving tools, scripts, or manual inspection to collect environmental data.

In the example of FIG. 4, the profile application 406 may need to be pre-programmed so as to know what data to collect and transmit from the device software stack 408 to the device mimic module 410. In another example, the process of figuring out which data points to clone can be fully automated.

Figure 5:
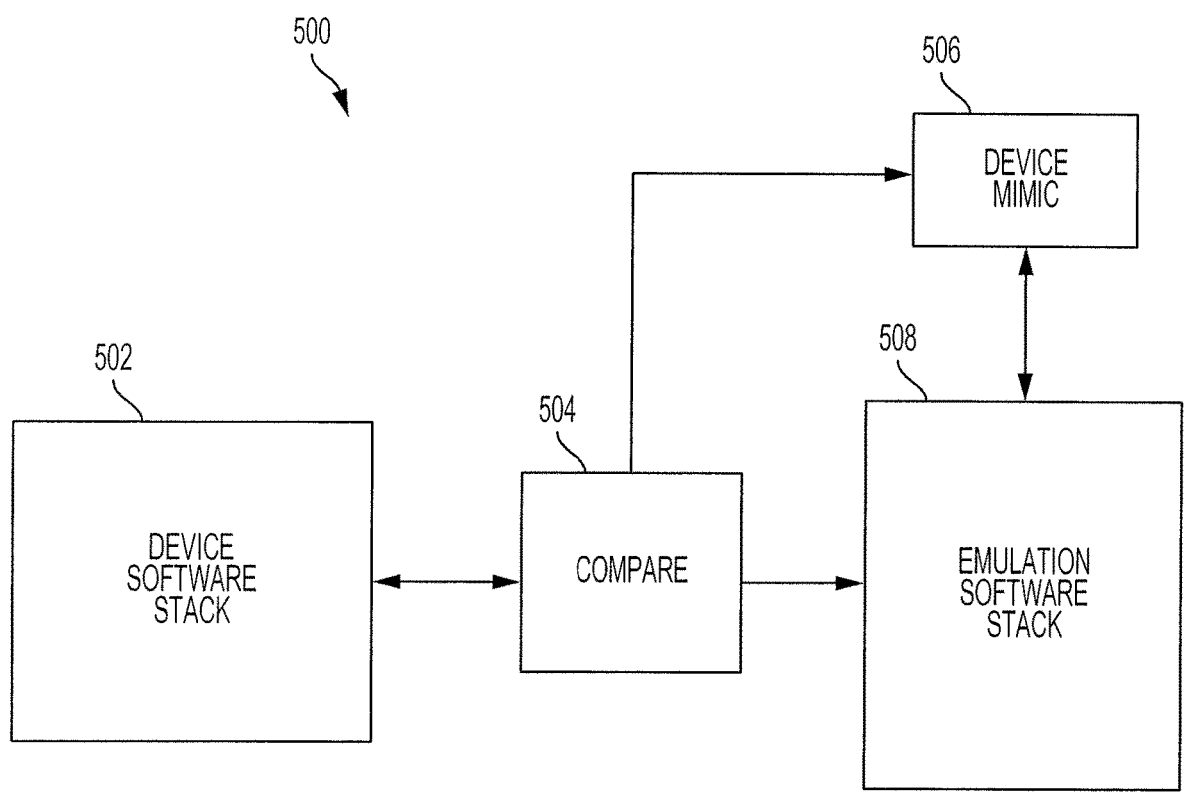
FIG. 5 illustrates an exemplary automated method for recording checkable artifacts for a mobile device according to examples of the disclosure.

FIG. 5 illustrates an exemplary automated method for recording checkable artifacts for a mobile device according to examples of the disclosure. In the system 500 illustrated in FIG. 5, a comparison module 504 can compare device data generated by a device software stack 502 located on a physical mobile device and an emulation software stack 508. If the comparison module 504 detects any substantial differences between the data being generated by the device software stack 502 and the emulation environment software stack 508, it can record the values generated by the device software stack 502 and transmit them to device mimic module 506. Thus when a mobile application under test calls for data, the device mimic 506 can either provide the data from the emulation software stack 508, or provide the data transmitted to it from the comparison module 504 that represents data from a "real-world" device software stack.

The degree of physical device replication illustrated in FIGS. 4 and 5, into emulated analysis environments can have the advantage of allowing security analysts to investigate sophisticated malware designed to target a very specific group of users using specific hardware platforms. Another use for replication is for bring-your-own-device environments, in which a fixed list of device models is approved for use with enterprise applications and data. The enterprise application vetting system can then be configured to include execution environments mimicking that list of approved devices.

A device mimic module with a spoofing framework like the ones described above can have the ability to alter and manipulate environmental features and data that are targeted specifically to the application being analyzed. As a result, other applications and operating system services are unaffected by the spoofing and can continue to operate normally. This can have the benefit of preventing the spoofed environment from causing crashes or other disruptions to the normal execution of the mobile device operating system environment, disruptions that could themselves provide a means for the application being tested to discern that it is being analyzed.

The approaches so far described for generating a mimicked device profile can require expert foreknowledge of the tactics and techniques used by malware to perform emulator detection. The systems illustrated in FIGS. 4 and 5, can be designed to populate a static database on the device mimic prior to loading a mobile application for testing in the emulation environment. However, persistent attackers can be motivated to find new forms of emulator detection to bypass these mechanisms and thus a device mimic module such as the ones described above can become obsolete as malware programmers seek to evolve emulation environment detection techniques. Thus, a system for mimicking a device software stack that can dynamically update the catchable artifacts it emulates may provide more robust protection against malware attempting to detect an emulation environment.

Figure 6:
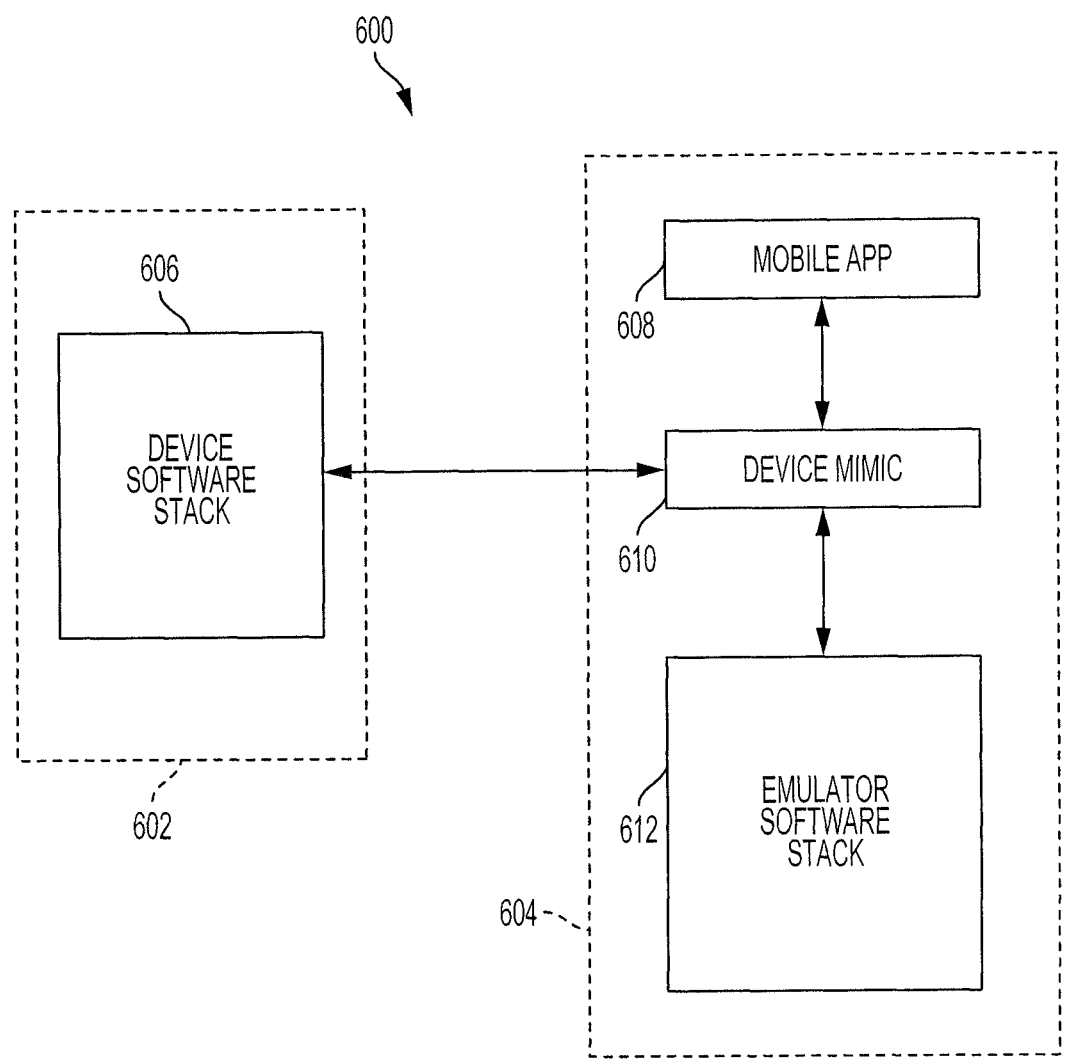
FIG. 6 illustrates an exemplary dynamic system for recording checkable artifacts for a mobile device according to examples of the disclosure.

FIG. 6 illustrates an exemplary dynamic system for recording checkable artifacts for a mobile device according to examples of the disclosure. The system 600 of FIG. 6 can include a real world physical device 602 and an emulation environment 604. When a mobile application 608 attempts to retrieve data from emulator software stack 612, a device mimic module 610 can intercept the call for data, and perform a lookup request to the physical device software stack 606. This approach can also simplify the implementation of the spoofing mechanisms and increase its reliability of such mechanisms.

In another example, the observation-based feedback loop to automatically identify the environmental parameters used by an anti-analysis implementation of malware can be created. Instead of requiring foreknowledge of which specific environmental factors must be mimicked to defeat anti-analysis, this process can instead learn those factors through observation. The intermediary mechanism can utilize its API and system call interception capability to monitor the environmental properties the application attempts to access. For each property identified, the system permutes its value if it already existed in the execution environment, or creates it on demand if it did not previously exist. Execution of the application can be duplicated and allowed to proceed along both paths (with and without the altered data). The behavior of the before and after copies of the application is compared for divergence, indicating the execution of some amount of the application's code was contingent on the identified system property. This can be an indicator to security analysts that the application contains potential anti-analysis behavior which should be flagged for further inspection.

In many instances, malware can seek to detect emulation environments by evaluating an application's user and sensor input for realism. As an example, malware may call data from an accelerometer from a mobile phone, and analyze the data returned to determine if the data matches the type of data one would expect from a real world device in which a user was walking or moving with the mobile device. In an emulation environment, which does not move, such accelerometer data would either be non-existent, or would not be commensurate with a real-world device that is physically moving.

Prior application vetting systems have relied heavily on fully automated input generation for driving applications. These techniques can have two significant limitations: 1) they can struggle to achieve high coverage of possible behavior paths in the application, often becoming stuck on complex user interfaces; and 2) the input streams they generate can easily be detected as mechanical. Introducing low-order noise into otherwise mechanical inputs can defeat the simplest anti-analysis techniques of this form, but cannot sufficiently emulate more complex patterns of data that are only produced by human users in real-world physical situations.

To overcome this limitation, a device mimic module can be provided with realistic application stimuli that it can use to mimic real-world environmental conditions. In one example, a live user can manually interact with an application running in a vetting test environment. This solution can overcome both of the fundamental problems of automated input generation. However it can be costly in terms of time, scalability, and can be difficult to achieve repeatability of experimental results.

Figure 7:
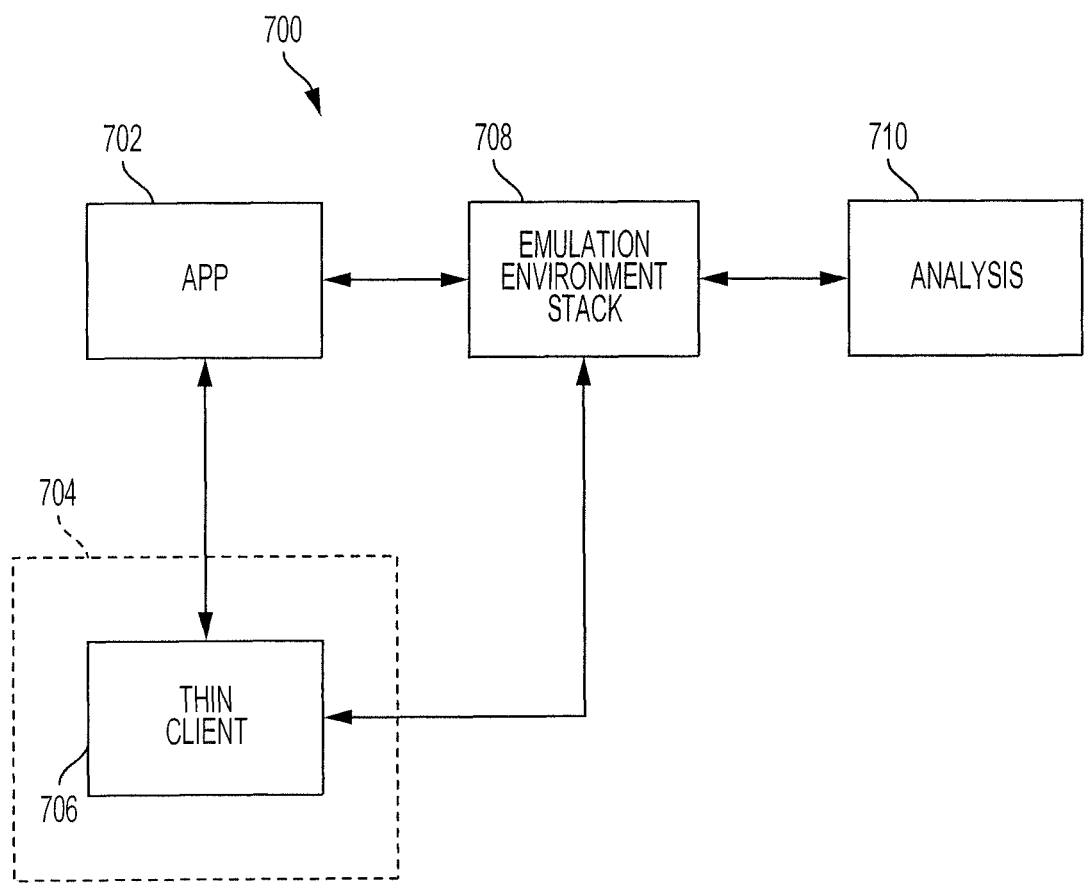
FIG. 7 illustrates an application stimuli recording system according to examples of the disclosure.

Thus, a system which can combine the best attributes of manual and automated input generation can prove beneficial to the problem of emulating real-world use of a device. FIG. 7 illustrates an application stimuli recording system according to examples of the disclosure. The system 700 can include a mobile application under test 702 that can interface with an emulation environment stack 708. In addition to interfacing with an emulation environment stack 708, the mobile application 702 can also interface with a thin client 706 that is stored on a real-world physical mobile device 704. The thin client 706 can record input traces from a real-world user of the mobile device 706. The input traces can then be sent to the emulation environment, wherein the emulation environment can send the data to the mobile application under test 702. In this way, the emulation environment is able to provide "real-world" data to a mobile application under test 702. Examples of "real-world" data can include accelerometer data, GPS data, multi-touch input from a user.

The system 700 can thus provide the mobile application under test 702 with substantially the same data that the mobile application would see if it were truly loaded on a mobile device. For instance if a real world user were initiating a multi-touch gesture on a mobile device, one would expect a certain degree of noise (due to a user's fingers not moving perfectly straight and uniform). If the emulation data were to be supplying the multi-touch data, that data may not contain the noise artifacts that a real live touch would generate, especially if the multi-touch data was provided to the emulation environment from an automated mechanical touch.

Thus, the input data traces recorded by the thin client 706 can be described as full featured in so far as the data includes artifacts from a human user's interaction with the device. These full featured input traces can be recorded into a data store for later use in repeatable vetting experiments against the target applications. A companion set of instrumentation in the emulation environment 708 can allow for these recorded input traces to be replayed from the data store and injected into the emulation environment such that they are indistinguishable from live manual input. Replaying input streams created by human users can guarantee that an application being tested in a vetting environment receives input that substantially matches that which it would receive in real world usage by end-users.

The thin client 706 can record the input data traces utilizing different mechanisms. In one example, the target application 702 can be decompiled and modified to intercept its interaction with input data streams. A main event loop of the application can be modified to route the input data events to the recording system before delivering the events to the original application code. The application can then be reassembled and installed on the mobile device 704.

In another example, the target application 702 can be embedded with a special purpose "container" application. The outer container can receive all inputs from the operating system of the emulation environment and route them to the thin client 706 before delivering the events to the contained application 702.

In another example, the operating system of the emulation environment can be modified to record all user and sensor input to a data store before delivering those events to an application.

As a final example, a "shimming" approach can be used in which the application is installed in an external emulation environment or second device. This environment can contain a special purpose remote access mechanism. A specialized "shim" form of the front-end client application can be placed on the user's physical device which is paired to the target application in a remote execution environment. Full touch, sensor, and location input data streams can be transmitted via the shim to a remote server and then on to the target application. At the server, the input stream events can be diverted and recorded into the data store for later playback before being delivered to the virtual device and replayed into the target application.

To multiply the variety of user input traces available for experimentation in vetting environments, individual recorded streams may be split into discreet fragments, permuted, and reassembled into new variant streams.

While the process of recording live usage sessions of an application can successfully solve the input realism problem, a large number of such traces can be required to achieve sufficiently broad coverage of an application's potential input-driven behaviors to make a vetting decision. To generate such volume of data, a segment of the actual end-user population asking for a new application can be utilized in the vetting of that application. As the application may not have undergone full vetting at this point, it can still be considered untrustworthy, so the method in which this live testing is performed can be performed so as to minimize risk to the enterprise.

In one example, the application can be deployed in isolated virtual environments in which users can access the application via a thin-client or shim approach as described above. The risk to a real world mobile device can be minimized by physically separating the untrusted application into a virtual environment isolated from user's physical devices.

In another example, a "low risk" subset of the user population can be selected based on various criteria (e.g., role in the enterprise, access to data, etc.), and the application can be deployed to this subset of users. In order to create a diverse capture of data, the subset should be large enough to ensure a broad range of application usage scenarios and similarly diverse generated input streams.

Many types of analysis environments can be available to application vetting analysts, including instrumented physical phones and tablets, emulators, and virtual machines of various types. Each of these environments can have a unique set of cost, scalability, and realism properties. Since any enterprise can only allocate a finite amount or resources to the security process of mobile application vetting, those limited resources should be optimally allocated to maximize the efficiency of the vetting process without sacrificing security assurances.

Different styles of analysis environments can be orchestrated to best achieve the goals of an enterprise security analyst. An orchestration system and user interface can allow security personnel to create a sequence of tests for an application under vetting. Analysts can choose a set of analysis environments to base their test upon, select the device mimicry parameters and profiles to apply to each environment, and choose from the library of pre-recorded user input stimuli traces to replay into those environments. The observed behavioral results of the application in each test environment, having been fed the same traces of user input, can be compared for variance and divergence. If any such divergence occurs, it can be a strong indicator that the tested application is acting evasively, which in turn correlates with malicious intent.

Figure 8:
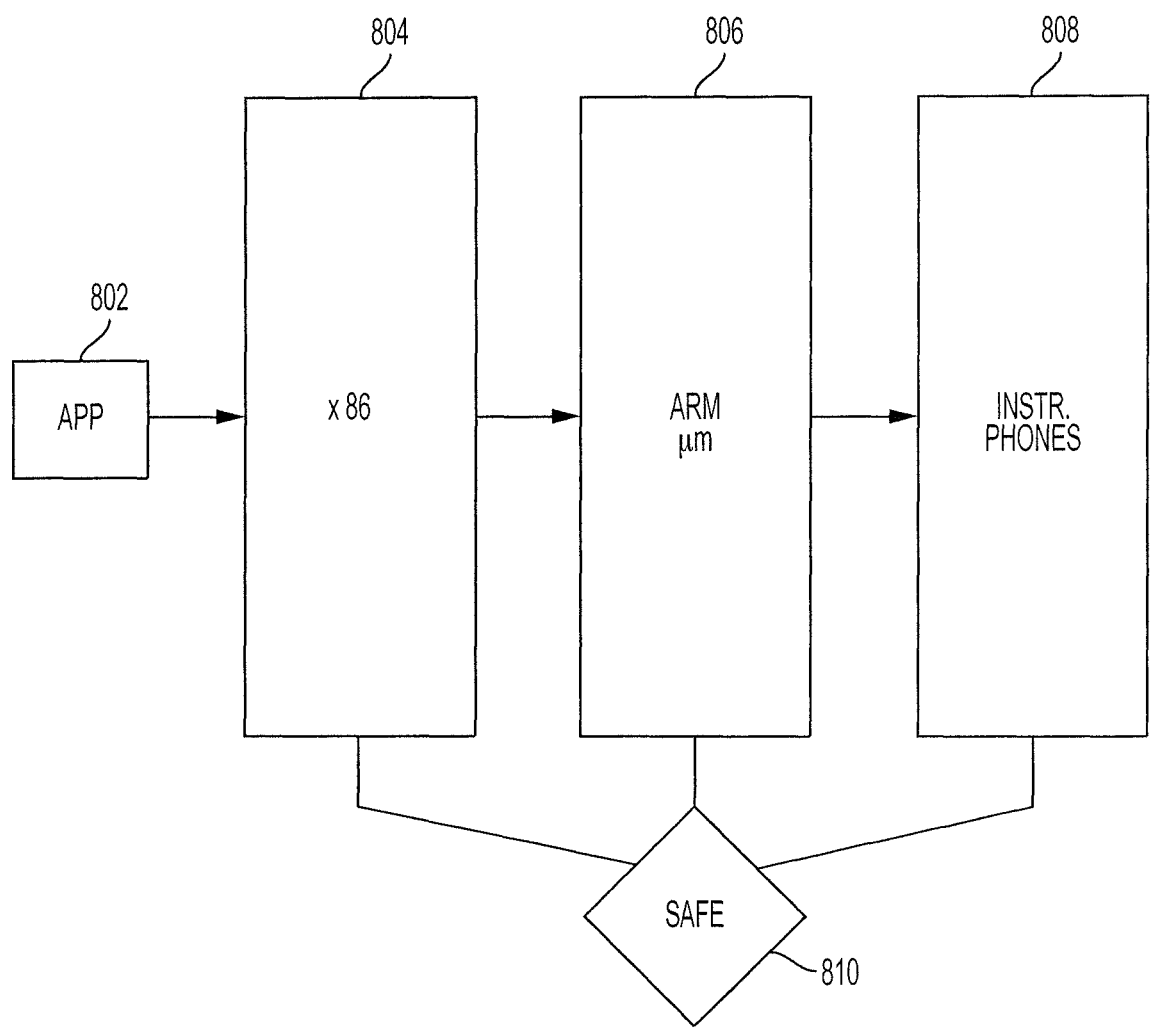
FIG. 8 illustrates an exemplary analysis environment scheme according to examples of the disclosure.

FIG. 8 illustrates an exemplary analysis environment scheme according to examples of the disclosure. The system 800 can include a mobile application under test 802 as well as three tiers of computing resources 804, 806, and 808 that can be dedicated to detecting the evasive malware techniques. The first tier 804 can include "cheaper" computing resources that are highly scalable however are less realistic as compared to actual physical mobile devices. In one example, tier 804 can be one or more Intel x86 virtual machines. The input traces gathered from real-world end users in this tier can be replayed in each successive tier 806 and 808 of the system 800. Each tier going from 804 to 806 to 808 can increase the realism of the environment, but at increasing cost and decreasing scalability. In one example tier 806 can include one or more ARM virtual machines and tier 808 can include real world mobile devices. If behavioral divergence is detected at any tier of the system 800, a notification can be sent to analysis module 810 wherein the application 802 can be rejected as acting suspiciously. This arrangement can act as a filter or sieve that can reject likely malicious applications at the earliest opportunity and having spent the least possible resources on their vetting.

The system or systems described above can be used in various application analysis tasks ranging from enterprise-scale application vetting to in-depth malware investigations. In one example, an enterprise security team may be tasked with determining which mobile applications are safe to deploy to its user base. Users can place a great demand on the vetting resources, often asking for a variety of third party applications for both business and, in the case of organizations implementing a corporate-owned personally-enabled mode, personal use. The enterprise may be left with two sub-optimal choices. In one example, the enterprise security team can optimize for security by choosing a high-assurance, but high-cost vetting process, which can lead to excessive backlogs of requested applications. In another example, the enterprise security team can optimize for speedy vetting results to fulfill user demands at the cost of lower security assurance.

The tools and systems described above, however, can provide an improved balance between the needs of users and the enterprise security requirements. The main benefit can come from including the user base in the vetting process. Providing immediate thin-client access to new applications running in a sandboxed virtual environment can allow users to obtain on-demand access to new capabilities without delay and without increasing risk to the enterprise. Many users may be willing to accept the usability impact of remote access to an application versus not having access to that application at all. At the same time, security analysts can benefit by obtaining measurements of applications running in real-world environments. Such measurements can be of higher quality, cover a wider breadth of usage patterns, and more accurately represent the behavior of the application in the real world as opposed to the confines of a security analysis sandbox.

The system and methods described above can allow for the recording and playback of the application interactions generated by the user base. When combined with the multi-tier filtering architecture described with respect to FIG. 8, vetting analysts can repeatably reproduce usage scenarios in differently configured execution environments. These environments can be instrumented to imitate different configurations of physical phones and tablets used by the enterprise, and an application's behavior compared across environments using the same input trace to identify highly targeted malicious applications. As a result, the systems and methods described above in the enterprise application vetting process can help to yield results that are both timely and secure.

The system and methods described above can also provide enhancements to the deep analysis of suspected malware, either with or without the aforementioned user-involved vetting workflow. Many advanced malicious applications for mobile devices can attempt to actively detect when they are being analyzed by an application vetting system, such as those used by the public application stores to filter submissions. These evasive capabilities can make it difficult for security personnel to perform deep inspection of suspect applications to determine the risks they pose and to gather other threat intelligence data. The systems and methods described above can help to solve this problem in two ways: 1) repeatable playback of realistic application input data traces; and 2) enhancing the realism of analysis sandbox environments to look more like real-world devices in use by actual end-users.

In one example, application input traces might come from a corpus collected from actual end-users as in the enterprise vetting case described above. Lacking that, in another example, analysts may interact with applications themselves to generate test traces. Multiple groups of analysts may work together to share test traces, either generated themselves or gathered from users. In any event, the traces can be recorded to allow for repeatable experimentation. The ability to execute reliably repeatable test cases opens up new possibilities for analysts. For example, one might repeat executing a particular input trace or series of traces while varying the parameters of an execution environment in order to analyze a piece of malware finely targeted at a particular group of users.

Another use for the systems and methods described above is in security incident response. Consider the case where a previously benign application receives an update containing a malicious implant. This can occur due to an otherwise reputable developer being compromised, as, as an example, in the case of the XcodeGhost attacks on Apple iOS app developers, or when ownership of an established application changes hands. To save resources, some app vetting workflows might scrutinize updates less than wholly new applications and can miss such a malicious update. As the update rolls out across the installed base, certain users may begin to notice suspicious behaviors. To discover the extent of this risk and the intent of the adversary, security analysts should examine the application to determine the triggers and targeting parameters of the malware.

A combination of systems and methods described above can assist security analysts overcome this challenging scenario. To begin, the suspect application can be installed in one or more instrumented execution environments which are configured to mimic the properties of different users' phones. Previously recorded user input traces for the application may then be fed into those environments to elicit a range of behaviors from the target. Differential analysis of those behaviors gathered from a variety of sandbox configurations can allow analysts to discover the objectives of the adversary and the parameters of the attack, yielding the information needed to effectively respond to the threat.

Figure 9:
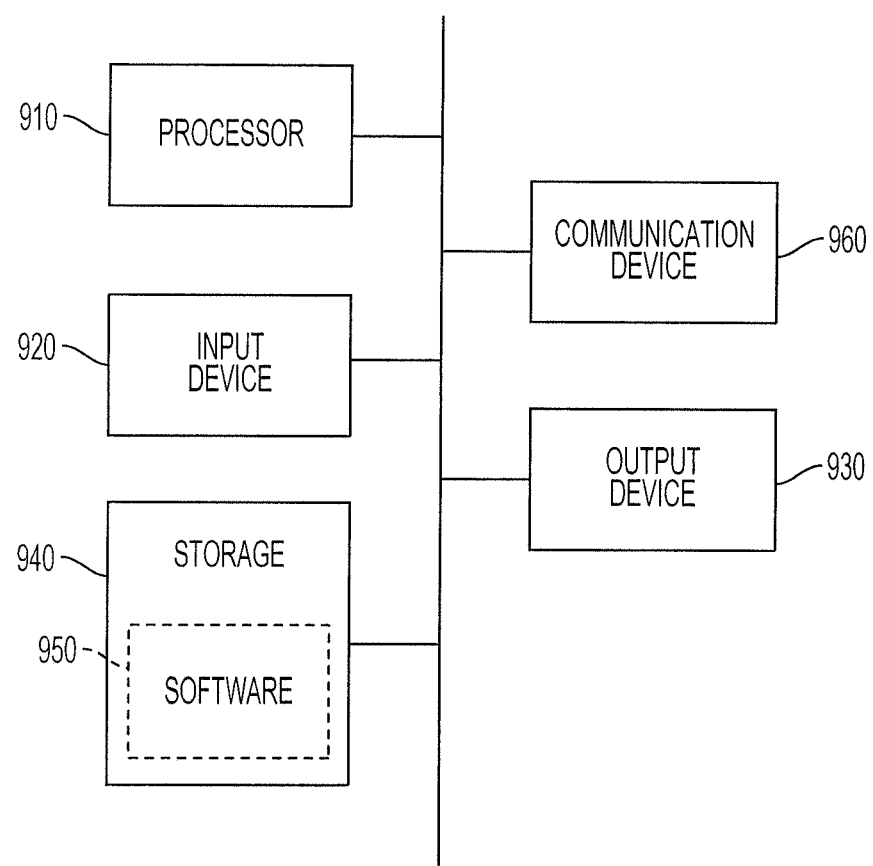
FIG. 9 illustrates an example of a computing device in accordance with one embodiment.

FIG. 9 illustrates an example of a computing device in accordance with one embodiment. Device 900 can be a host computer connected to a network. Device 900 can be a client computer or a server. As shown in FIG. 9, device 900 can be any suitable type of microprocessor-based device, such as a personal computer, workstation, server or handheld computing device (portable electronic device) such as a phone or tablet. The device can include, for example, one or more of processor 910, input device 920, output device 930, storage 940, and communication device 960. Input device 920 and output device 930 can generally correspond to those described above, and can either be connectable or integrated with the computer.

Input device 920 can be any suitable device that provides input, such as a touch screen, keyboard or keypad, mouse, or voice-recognition device. Output device 930 can be any suitable device that provides output, such as a touch screen, haptics device, or speaker.

Storage 940 can be any suitable device that provides storage, such as an electrical, magnetic or optical memory including a RAM, cache, hard drive, or removable storage disk. Communication device 960 can include any suitable device capable of transmitting and receiving signals over a network, such as a network interface chip or device. The components of the computer can be connected in any suitable manner, such as via a physical bus or wirelessly.

Software 950, which can be stored in storage 940 and executed by processor 910, can include, for example, the programming that embodies the functionality of the present disclosure (e.g., as embodied in the devices as described above).

Software 950 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 940, that can contain or store programming for use by or in connection with an instruction execution system, apparatus, or device.

Software 950 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 900 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 900 can implement any operating system suitable for operating on the network. Software 950 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

The systems and methods described above can enable monitoring and controlling of network traffic generated and received by a mobile device. The systems and methods can be used to protect mobile devices such as smartphones from viruses, malware, adware, exploits, and other computer attacks.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for enhancing realism of an emulation environment provided to a mobile device software application to determine whether the mobile device software application contains malware, the method comprising:
storing one or more spoofed checkable artifacts in a data store, wherein the one or more spoofed artifacts corresponds to one or more checkable artifacts and are collected from the mobile device by:
recording data associated with a user of the mobile device's interaction with the mobile device, wherein the recorded data corresponds to the one or more checkable artifacts, and
receiving the recorded data from the mobile device to the emulation environment;
receiving a call for data from the mobile device software application;
determining whether the received call for data includes a call for the one or more checkable artifacts;
in response to determining that the received call for data includes a call for one or more checkable artifacts:
transmitting the one or more spoofed checkable artifacts from the data store to the mobile device software application, wherein the one or more spoofed checkable artifacts corresponds to the one or more checkable artifacts included with the call for data, and wherein the one or more spoofed checkable artifacts includes the recorded data of the mobile device; and
analyzing interactions between the mobile device software application and the emulation environment to determine whether the mobile device software application contains malware, wherein transmitting the one or more spoofed checkable artifacts to the mobile device software application in response to determining that the received call for data includes the call for the one or more checkable artifacts prevents the mobile device software application from detecting that it is operating within the emulation environment.

2. The method of claim 1, wherein the one or more checkable artifacts includes data that allows the mobile device software application to determine that it is operating in the emulation environment.

3. The method of claim 1, wherein the one or more spoofed checkable artifacts are collected from the mobile device by:
installing a thin-client application on the mobile device.

4. The method of claim 1, wherein recording the user of the mobile device's interaction with the mobile device includes recording data associated with the user's physical handling of the device.

5. The method of claim 1, wherein the one or more spoofed checkable artifacts are collected from the mobile device by:
comparing one or more values associated with one or more checkable artifacts stored on the emulation environment with one or more values associated with one or more checkable artifacts stored on the mobile device;
determining whether the values of the one or more checkable artifacts stored on the emulation environment are different than the values of the one or more checkable artifacts stored on the mobile device; and
transmitting the values of the one or more checkable artifacts stored on the mobile device to the emulation environment if it is determined that the values stored on the emulation environment are different than the values stored on the mobile device.

6. A non-transitory computer readable storage medium having stored thereon a set of instructions for enhancing realism of an emulation environment provided to a mobile device software application to determine whether the mobile device software application contains malware, wherein the set of instructions when executed by a computing device, cause the computing device to:
store one or more spoofed checkable artifacts in a data store, wherein the one or more spoofed artifacts corresponds to one or more checkable artifacts and are collected from the mobile device by:
recording data associated with a user of the mobile device's interaction with the mobile device, wherein the recorded data corresponds to the one or more checkable artifacts, and
receiving the recorded data from the mobile device to the emulation environment;
receive a call for data from the mobile device software application;
determine whether the received call for data includes a call for one or more checkable artifacts;
in response to determining that the received call for data includes a call for the one or more checkable artifacts:
transmit the one or more spoofed checkable artifacts from the data store to the mobile device software application, wherein the one or more spoofed checkable artifacts corresponds to the one or more checkable artifacts included with the call for data, and wherein the one or more spoofed checkable artifacts includes the recorded data of the mobile device; and
analyze interactions between the mobile device software application and the emulation environment to determine whether the mobile device software application contains malware, wherein the one or more spoofed checkable artifacts transmitted to the mobile device software application in response to determining that the received call for data includes the call for the one or more checkable artifacts prevents the mobile device software application from detecting that it is operating within the emulation environment.

7. The non-transitory computer readable storage medium of claim 6, wherein the one or more checkable artifacts includes data that allows the mobile device software application to determine that it is operating in the emulation environment.

8. The non-transitory computer readable storage medium of claim 6, wherein the one or more spoofed checkable artifacts are collected from the mobile device by:
installing a thin-client application on the mobile device.

9. The non-transitory computer readable storage medium of claim 6, wherein recording the user of the mobile device's interaction with the mobile device includes recording data associated with the user's physical handling of the device.

10. The non-transitory computer readable storage medium of claim 6, wherein the one or more spoofed checkable artifacts are collected from the mobile device by:
comparing one or more values associated with one or more checkable artifacts stored on the emulation environment with one or more values associated with one or more checkable artifacts stored on the mobile device;
determining whether the values of the one or more checkable artifacts stored on the emulation environment are different than the values of the one or more checkable artifacts stored on the mobile device; and
transmitting the values of the one or more checkable artifacts stored on the mobile device to the emulation environment if it is determined that the values stored on the emulation environment are different than the values stored on the mobile device.

11. A system for enhancing realism of an emulation environment provided to a mobile device software application to determine whether the mobile device software application contains malware, comprising:
one or more processors; and memory storing one or more programming instructions that when executed by the one or more processors cause the one or more processors to:

store one or more spoofed checkable artifacts in a data store, wherein the one or more spoofed artifacts corresponds to one or more checkable artifacts and are collected from the mobile device by:
- recording data associated with a user of the mobile device's interaction with the mobile device, wherein the recorded data corresponds to the one or more checkable artifacts, and
- receiving the recorded data from the mobile device to the emulation environment;

receive a call for data from a mobile device software application stored in the memory of the system;

determine whether the received call for data includes a call for the one or more checkable artifacts;

in response to determining that the received call for data includes a call for one or more checkable artifacts:
- transmit the one or more spoofed checkable artifacts from the data store to the mobile device software application, wherein the one or more spoofed checkable artifacts corresponds to the one or more checkable artifacts included with the call for data, and wherein the one or more spoofed checkable artifacts includes the recorded data of the mobile device; and analyze interactions between the mobile device software application and the emulation environment to determine whether the mobile device software application contains malware, wherein transmitting the one or more spoofed checkable artifacts to the mobile device software application in response to determining that the received call for data includes the call for the one or more checkable artifacts prevents the mobile device software application from detecting that it is operating within the emulation environment.

12. The computing system of claim 11, wherein the one or more checkable artifacts includes data that allows the mobile device software application to determine that it is operating in the emulation environment.

13. The computing system of claim 11, wherein the one or more spoofed checkable artifacts are collected from the mobile device by:
installing a thin-client application on the mobile device.

14. The computing system of claim 11, wherein recording the user of the mobile device's interaction with the mobile device includes recording data associated with the user's physical handling of the device.

15. The computing system of claim 11, wherein the one or more spoofed checkable artifacts are collected from the mobile device by:
- comparing one or more values associated with one or more checkable artifacts stored on the emulation environment with one or more values associated with one or more checkable artifacts stored on the mobile device;
- determining whether the values of the one or more checkable artifacts stored on the emulation environment are different than the values of the one or more checkable artifacts stored on the mobile device; and
- transmitting the values of the one or more checkable artifacts stored on the mobile device to the emulation environment if it is determined that the values stored on the emulation environment are different than the values stored on the mobile device.

* * * * *